United States Patent [19]

Schugt et al.

[11] Patent Number: 5,934,694
[45] Date of Patent: Aug. 10, 1999

[54] CART RETRIEVER VEHICLE

[75] Inventors: William Schugt, Mound; Stephen Dominquez, Minneapolis, both of Minn.

[73] Assignee: Dane Industries, Plymouth, Minn.

[21] Appl. No.: 08/600,627

[22] Filed: Feb. 13, 1996

[51] Int. Cl.$^6$ .................................................. B62D 39/00
[52] U.S. Cl. .............................. 280/33.991; 280/33.992; 180/65.1; 180/167
[58] Field of Search .................................. 180/167, 65.1, 180/65.6, 15, 16, 19.1, 19.2, 19.3, 14.1, 22, 21, 209, 907, 11; 280/33.991, 33.992, 504, 510

[56] References Cited

U.S. PATENT DOCUMENTS

| | | |
|---|---|---|
| 3,524,512 | 8/1970 | Voeks et al. . |
| 3,575,250 | 4/1971 | Dykes . |
| 4,096,920 | 6/1978 | Heyn . |
| 4,771,840 | 9/1988 | Keller . |
| 4,993,507 | 2/1991 | Ohkura ..................................... 180/168 |
| 5,064,012 | 11/1991 | Losego . |
| 5,082,074 | 1/1992 | Fischer . |
| 5,109,566 | 5/1992 | Kobayashi et al. ........................ 15/319 |
| 5,110,189 | 5/1992 | Haines ..................................... 299/30 |
| 5,161,634 | 11/1992 | Ichihara et al. .......................... 180/179 |
| 5,322,306 | 6/1994 | Coleman . |
| 5,439,069 | 8/1995 | Beeler . |

FOREIGN PATENT DOCUMENTS

| | | |
|---|---|---|
| 2350308 | 10/1973 | Germany . |
| 2450692 | 10/1974 | Germany . |

Primary Examiner—Lanna Mai
Assistant Examiner—Michael Cuff
Attorney, Agent, or Firm—Brinks Hofer Gilson & Lione

[57] ABSTRACT

A vehicle for retrieving wheeled shopping carts in parking lots. The vehicle is an electric-powered vehicle with electronic remote control which allows one operator to use the device for retrieval of the wheeled shopping carts. The vehicle can be operated in a remote or manual mode. The vehicle includes a cart coupling means for securing the wheeled shopping carts to the vehicle. The cart coupling means is electrically isolated from the vehicle. The coupling means includes two arcuate jaw members which surround the rear tube frame members of the shopping cart. A locking rod is pushed across one jaw member to secure the shopping cart to the coupler assembly. When operating in the remote control, the operator guides the vehicle with a radio transmitter. The vehicle can likewise be operated in a manual mode. The vehicle provides a foot pedal seat and steering wheel for manual operation. The electric drive means for powering the vehicle includes dynamic braking and a parking brake. The parking brake is actuated automatically when the vehicle has come to a stop or the operator sets the brake manually.

37 Claims, 10 Drawing Sheets

CART RETRIEVER VEHICLE

BACKGROUND OF THE INVENTION

I. Field of the Invention

This invention relates to a device designed to assist in the retrieval of wheeled shopping carts in parking lots and more particularly to an electric powered vehicle with electronic remote control allowing one operator to use the device for retrieval of wheeled shopping carts.

II. Discussion of the Prior Art

Retrieving shopping carts in large parking lots is primarily a manual task. Workers push or pull a column of stacked wheeled shopping carts from various collection areas located throughout large parking lots. The longer the column of carts being pushed or pulled, the more difficult it becomes to control. Thus, workers limit the number of carts. Even with more than one worker, the collecting and guiding of long columns of carts is difficult and time consuming. Furthermore, in large parking lots workers must push or pull the column of carts a great distance. The retrieval task can be physically exhausting and may result in injury to the workers. Carts also can be damage as the workers struggle to push or pull long columns to the store door.

In response to the difficulties with manual retrieval of shopping carts, a prior art apparatus involves using a motorized device for pulling a column of shopping carts through the parking lot in a train like fashion. A rope extends from the motorized device and is fastened to the last cart in the column of carts. Each time a cart is added to the column, the rope must be unfastened from the previous cart, extended further and then secured to the cart added at the end of the column. The operator walks alongside the motorized device as it pulls up to thirty five carts. This prior art device requires operators at both ends of the column or requires the operator to run back and forth between the cart end of the column and the motorized device end of the column because operations occur at both ends of the column of carts. Additionally, the speed of the device is limited to a preset speed which can only be adjusted by programing the microprocessor controller in the device. When the carts are brought to the entrance of the store, the prior art device is difficult to maneuver inside the store. The carts must still be manually pushed or pulled into the store. This can be a difficult task if the column is quite long.

Therefore, what is needed is a cart retrieval system which allows operation by a single individual and eliminates the need for the individual to manually manipulate the long column of carts. The present invention addresses this concern by providing an electrically powered cart retrieval vehicle which can be operated by remote control.

SUMMARY OF THE INVENTION

The present invention is a vehicle for retrieving wheeled shopping carts in parking lots. The vehicle is an electric powered vehicle housing six 6 volt batteries in two parallel banks in the vehicle's chassis. An upper housing is hinged to the chassis and contains a seat for the operator, a steering wheel, a control console and an antenna pole. The vehicle can be operated in a remote or manual mode. When operated manually, the operator sits in the seat, controls the vehicle speed and direction with the a foot pedal, the control console and the steering wheel. In the remote mode, a radio transmitter is used by the operator to control the speed and direction of the vehicle and column of carts secured to the vehicle. The operator then steers the column of carts at the end of the column opposite the vehicle.

The vehicle includes a cart coupler located on its front end which secures one shopping cart to the vehicle. The cart coupler is electrically isolated from the vehicle and contains a jaw bar having two arcuate jaw members which will surround the lower back tubular members of the shopping cart. The cart coupler additionally includes a locking pin on one jaw member which extends across the open portion of the jaw to lock the shopping cart tubular member to the arcuate jaw.

The vehicle includes a worm gear drive connected to the drive motor. The motor utilizes dynamic breaking for stopping the vehicle. Additionally an emergency or parking break assembly is included in the drive assembly. The drive motor shaft includes a tachometer disk assembly which is used to determine the speed of the vehicle. The emergency or parking brake activates a lever which is forced against the tachometer disc when the emergency brake is activated. The friction between the lever and the tachometer disc causes the braking action of the emergency brake.

A central controller is used to operate the vehicle. The central controller receives the operation signals from either the control console on the vehicle or the remote transmitter received by the vehicle via the antenna. The controller send the appropriate signal to the drive motor and brake motor. The central controller also receives a signal from the tachometer disk assembly regarding the speed of the vehicle. If the speed exceeds a predetermined speed, the controller sends an signal to limit the top output rpm of the motor.

The vehicle includes various safety features such as a rotating beacon at the top of the antenna pole, a brake light and reflective material stripes surrounding the vehicle. The vehicle may include optional features such as brackets for receiving weights to act as ballast, a trailer hitch and a refuse container located on top of the housing.

The primary object of the present invention is to provide a vehicle for retrieving wheeled shopping carts in large parking lots with the vehicle being operable in a remote control or manual mode thus eliminating the need for individual workers to manually manipulate the long column of carts.

Still another object of the present invention is to provide a rechargeable electric powered vehicle for retrieving wheeled shopping carts which is easily used in either a manual or remote control mode for retrieving long columns up to seventy-five shopping carts.

A further object of the present invention is to provide a shopping retrieval vehicle that incorporates a safety feature limiting the speed of the vehicle and having a controller which automatically limits the top output rpm of the drive motor at a predetermined speed.

Another object of the present invention is to provide a vehicle which is easily driven and steered by an operator sitting on the vehicle when operating in the manual mode or when the operator is located at the opposite end of the column of carts from the vehicle when operating in the remote control mode.

A further object of the present invention is to provide a vehicle for retrieving wheeled shopping carts which can operate in all types of weather conditions including snow, sleet, rain and ice and which can push up to seventy-five carts.

DESCRIPTION OF THE DRAWINGS

The foregoing features, objects and advantages of the invention will become apparent to those skilled in the art from the following detailed description when considered in connection with the accompanying drawings, in which like reference numerals designate like parts throughout the figures thereof and wherein.

DESCRIPTION OF THE PREFERRED EMBODIMENT

Figure 1:
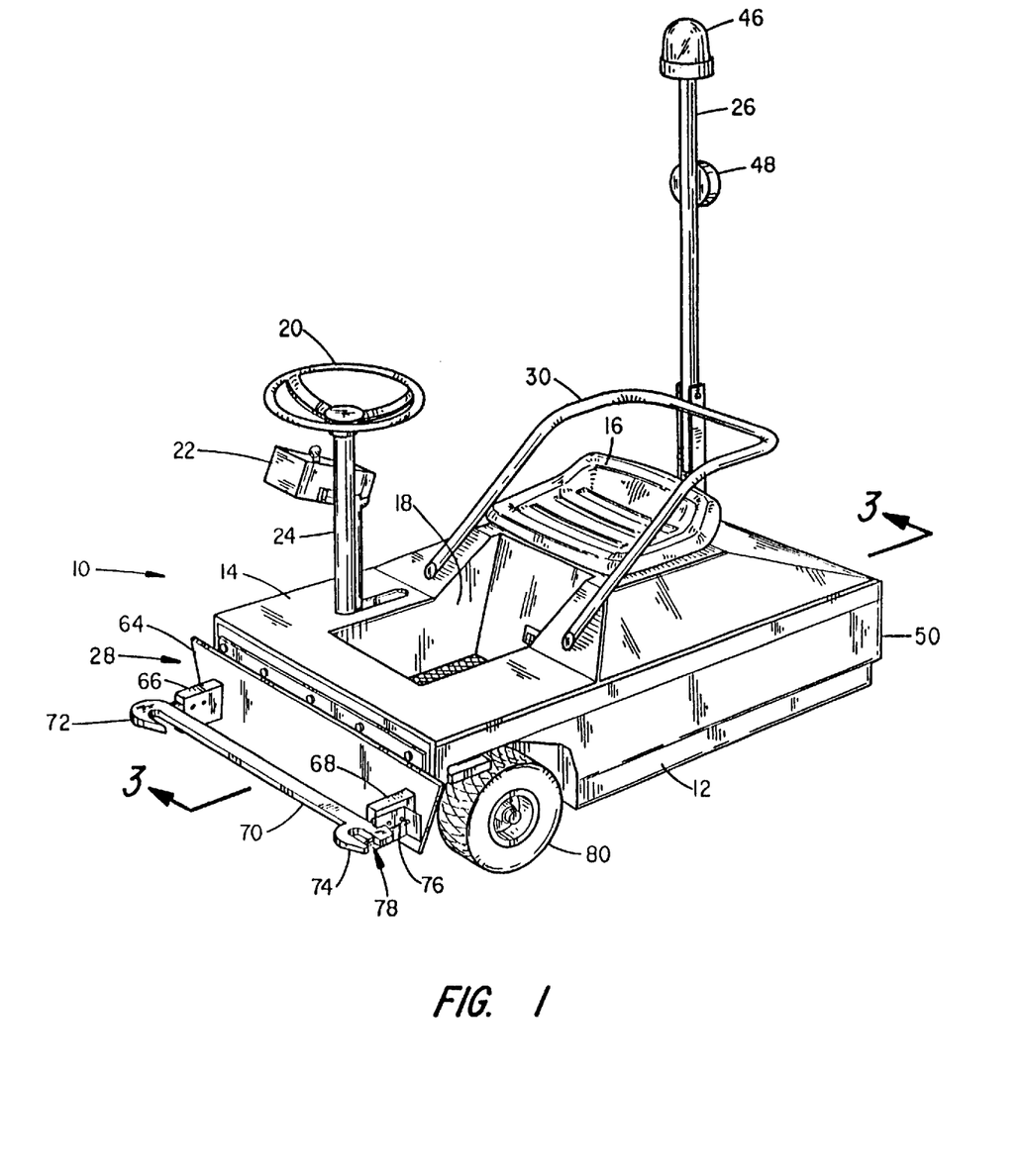
FIG. 1 is a perspective view of the vehicle of the present invention.
Figure 2:
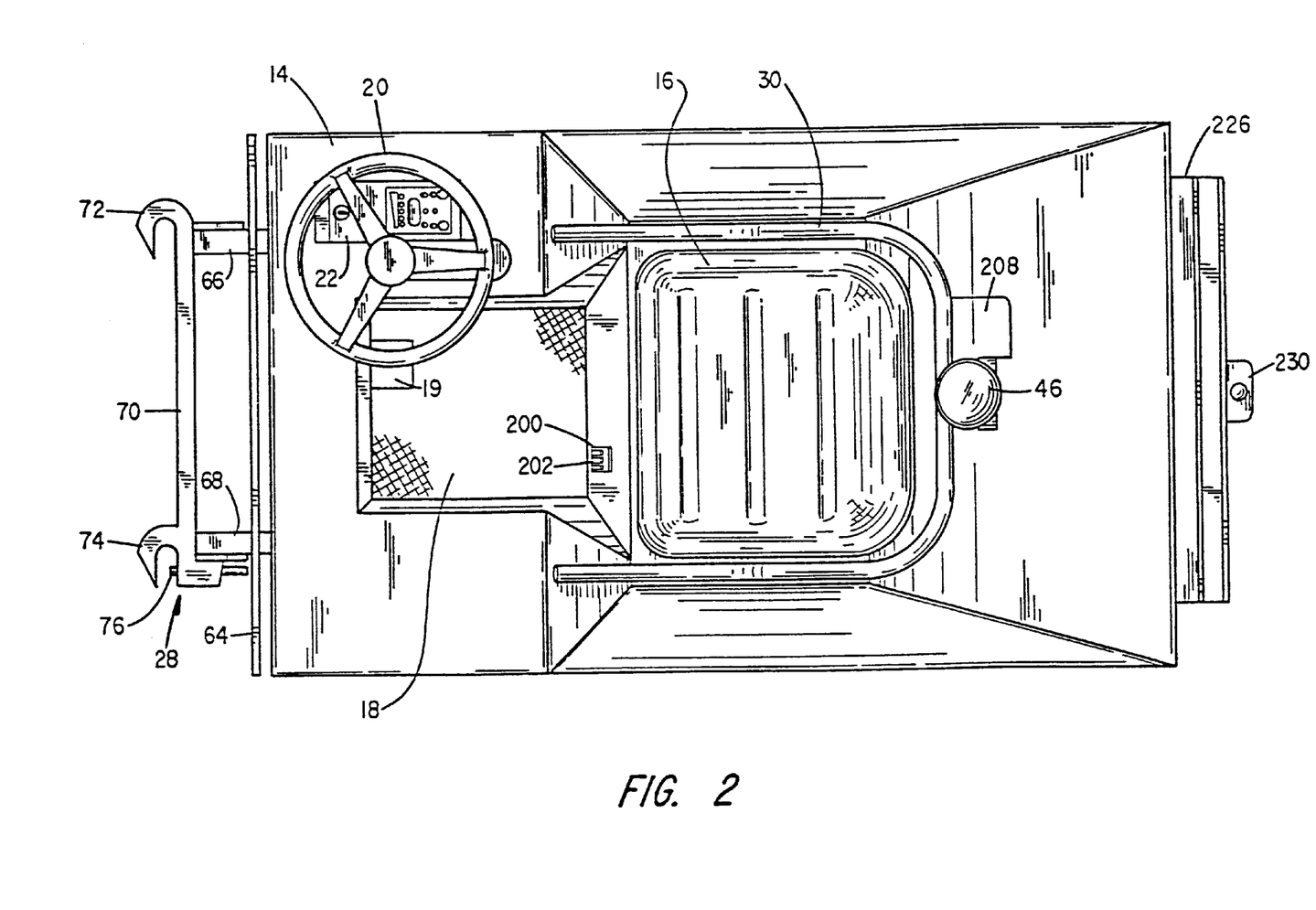
FIG. 2 is a top view of the vehicle of the present invention.
Figure 3:
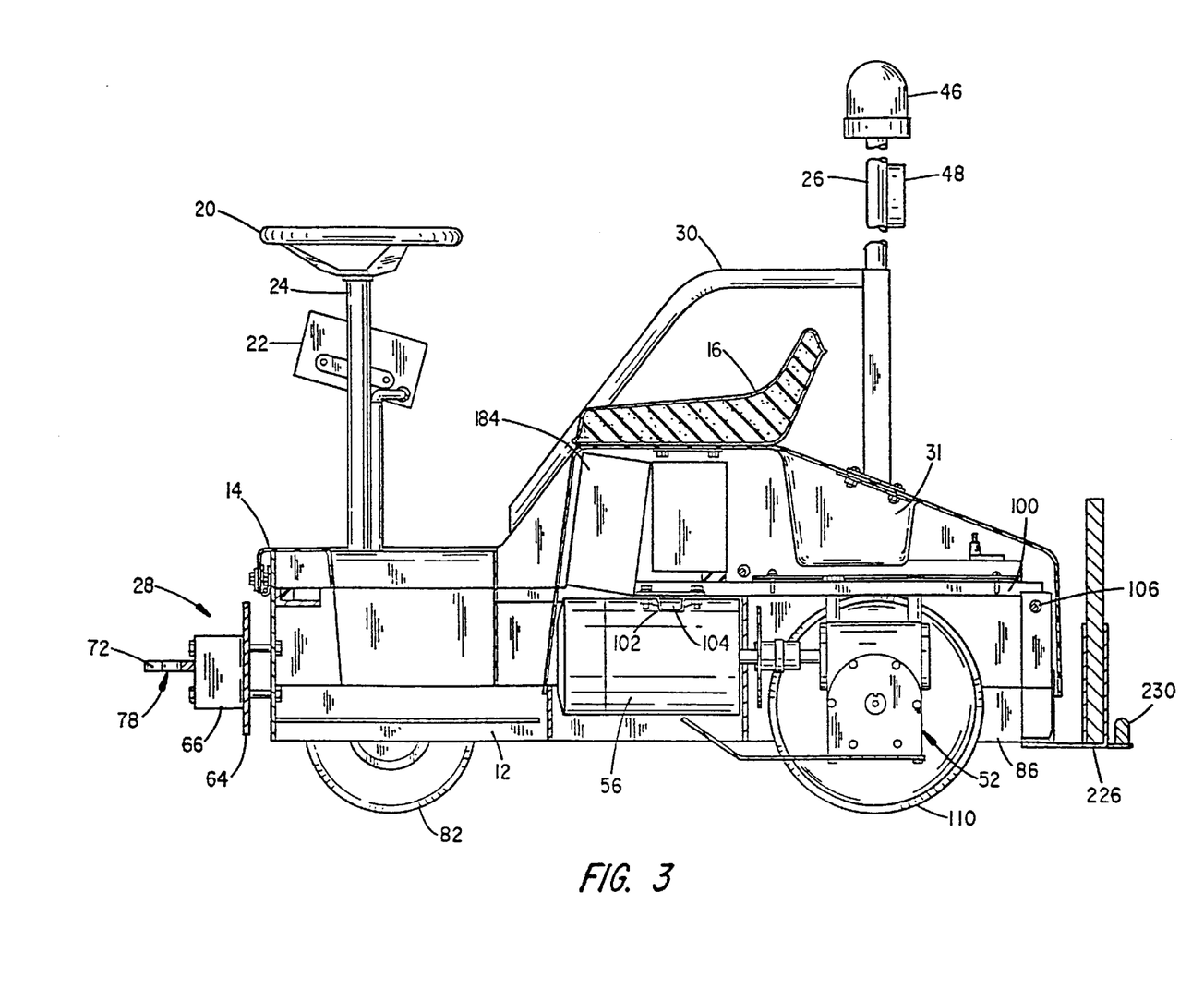
FIG. 3 is a cross-sectional view taken along line 3—3 in FIG. 1.

The present invention is an electric powered vehicle used for the retrieval of wheeled shopping carts. Turning to FIGS. 1, 2 and 3, the vehicle, designated 10, has a steel chassis 12 and an upper housing 14. The vehicle includes a seat 16 for the operator, a recessed foot area 18 which contains a foot pedal 19 and a steering wheel 20. A control box 22 is located on the steering column 24, and an antenna pole 26 for receiving the signal from a remote controller is located behind the seat 16. A shopping cart coupler 28 is located on the front of the vehicle 10.

Figure 9:
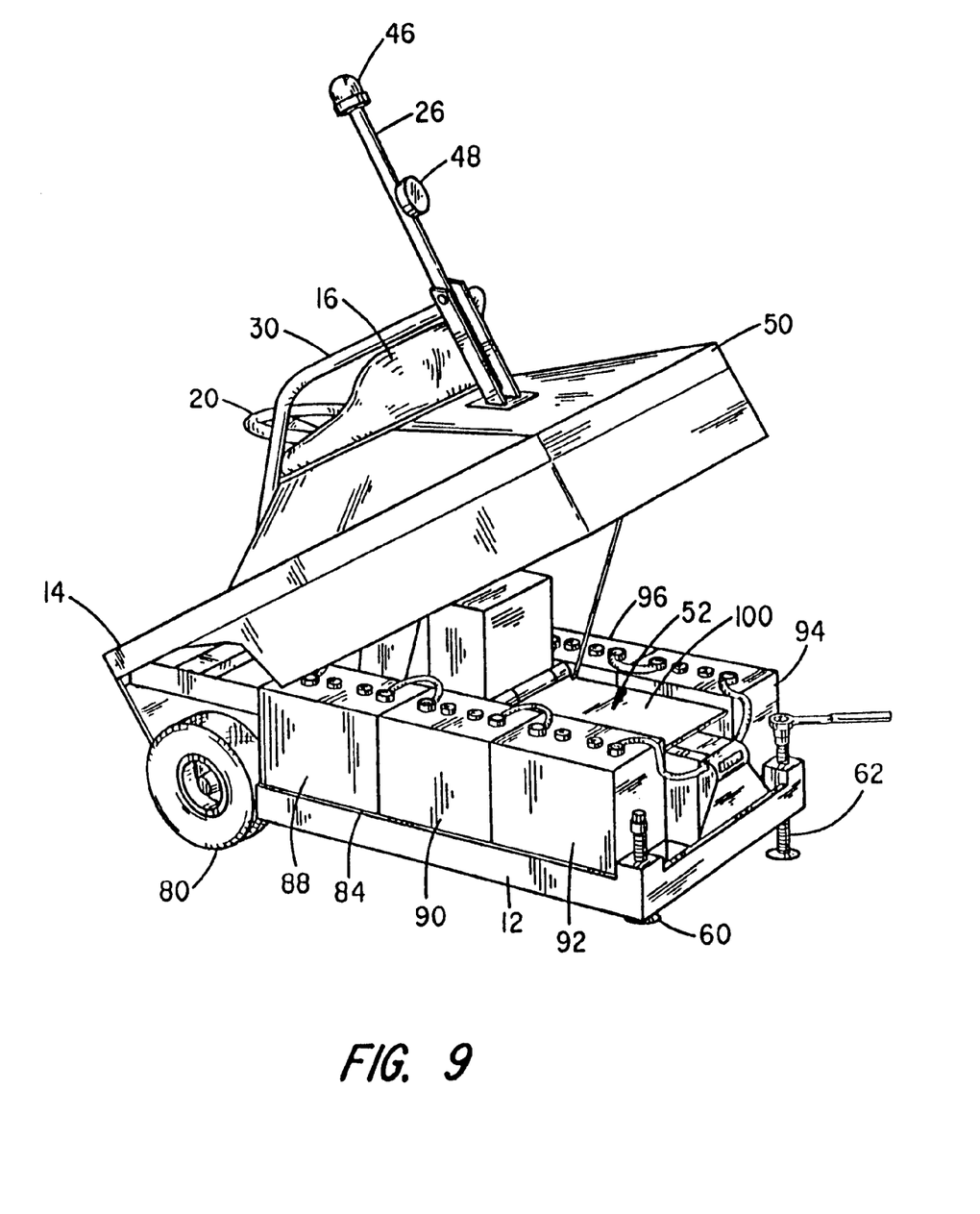
FIG. 9 is a rear perspective view of the present invention with the housing raised.

The upper housing 14 of the vehicle 10 is preferably a one-piece molded polyethylene or fiberglass housing. As seen in FIGS. 2 and 9, the upper housing 14 is hinged to the chassis 12 at the front. This allows the upper housing to be raised, as seen in FIG. 9, to provide access to the controller 184, motor 56, parking brake assembly 124, drive assembly 52 and related components for servicing as will be explained in greater detail below. The seat 16 includes arm and back rest 30. The upper housing 14 additionally includes a storage pocket 31 with a hinged, sealed cover into which a ten-foot cord for charging the vehicle (not shown) and a radio transmitter 160 are placed when not in use. The antenna pole 26 is preferably a hinged steel pole extending from the aft portion of the housing 14 that acts as a radio antenna when the vehicle 10 is operating in the remote control mode. The pole 26 can fold down for storage purposes.

Figure 7:
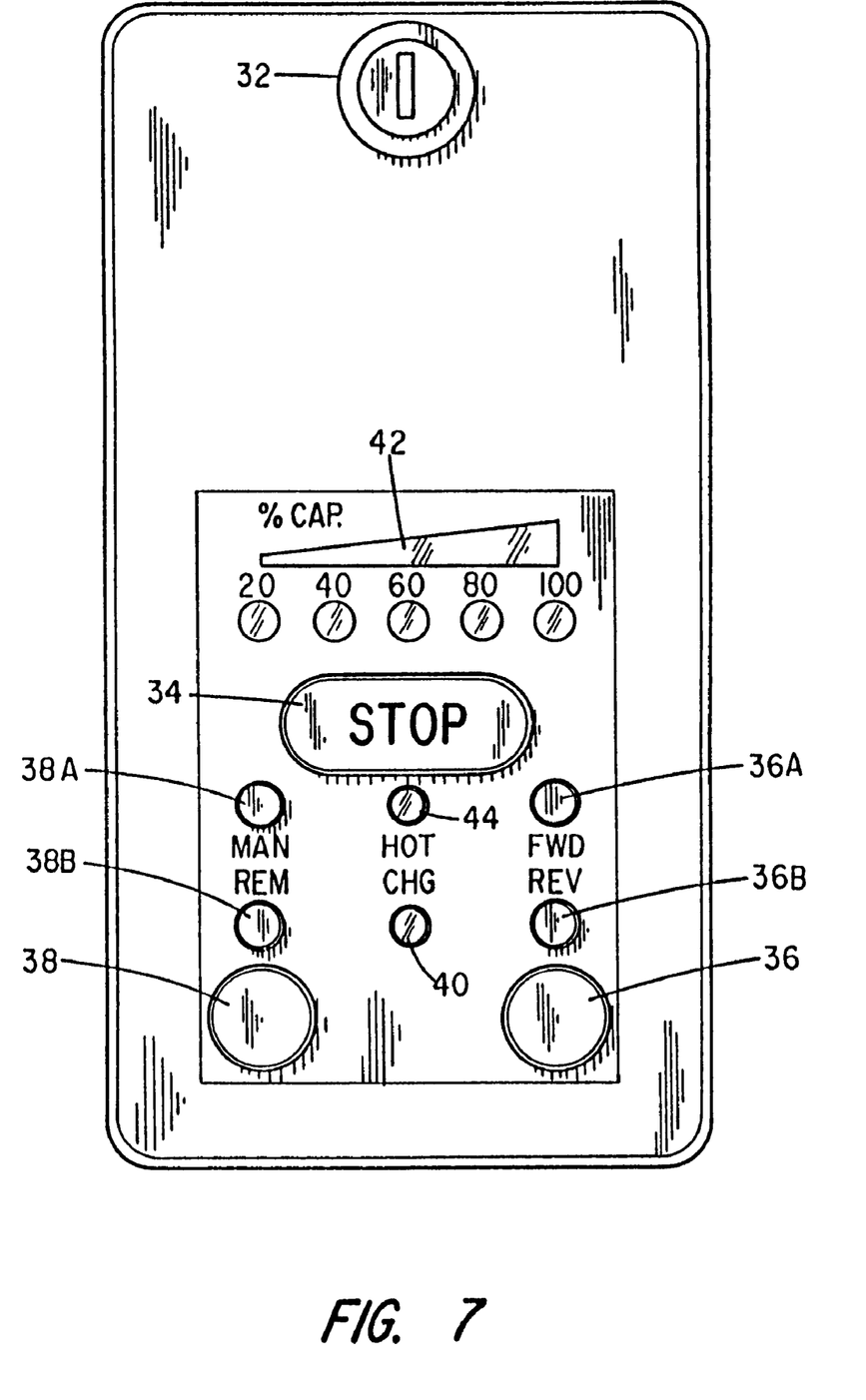
FIG. 7 is a top view of the console controller of the present invention.

The control console 22, shown in FIGS. 2 and 7, has controls for both operation of the vehicle and battery charging of the vehicle. A key switch 32, emergency stop 34 and forward and reverse direction selector 36 are located on the console and used for the operation of the device. Indicator 36a lights up when the forward direction is selected and indicator 36b lights up when the reverse direction is selected. The control console includes a push button 38 for selecting a manual control mode or a remote control mode. Indicator 38a lights up when the manual mode is selected and indicator 38b lights up when the remote control mode is selected. The control console additionally has an indicator 40 which lights up when charging the batteries, with charge level indicators 42, and an overheated condition indicator 44. The control console is preferably covered by a weatherproof membrane.

The vehicle has several safety features on its exterior. A rotating beacon 46 is mounted on the top of the antenna pole 26. A high visibility taillight 48 is mounted on the antenna pole 26 and reflective tape 50 is located on all four sides of the vehicle.

The steel chassis 12 forms the main frame of the vehicle and houses, the drive assembly 52, the emergency brake assembly 54, the motor assembly 56, the steering mechanism 58, the batteries, the central controller 184 and auxiliary components. The steel chassis 12 can include screw jacks 60 and 62 located in the aft corners as seen in FIG. 9. The exterior of the steel chassis includes the shopping cart coupler 28 in the lower front.

The shopping cart coupler 28 includes a front plate 64 with two mounting blocks 66 and 68 as seen in FIGS. 1, 2, 3 and 6. A coupler jaw bar 70 is mounted to the two mounting blocks 66 and 68. These mounting blocks are preferably made from plastic to electrically isolate the vehicle 10 from the coupler jaw bar 70. The coupler jaw bar 70 includes jaws 72 and 74 on opposite ends for surrounding the legs, shown in broken line as 204 and 206, of a shopping cart. One of the jaws has a locking pin 76 which has a locking rod 76a and a foot activation plate 76b. The locking pin is foot actuated by pressing on the activation plate 76b. When actuated, the locking rod 76a extends across the open portion 78 of jaw 72.

The chassis 12 is indented at its front corners to form areas for the two front steering wheels 80 and 82. The steering column 24 is coupled to one of the front wheels, which in turn is coupled to the other front wheel with the tie rod (not shown) in a well known manner as one skilled in the art can appreciate. Turning the steering wheel to the left causes the vehicle to turn to the left and turning the steering wheel to the right causes the vehicle to turn to the right.

Figure 4:
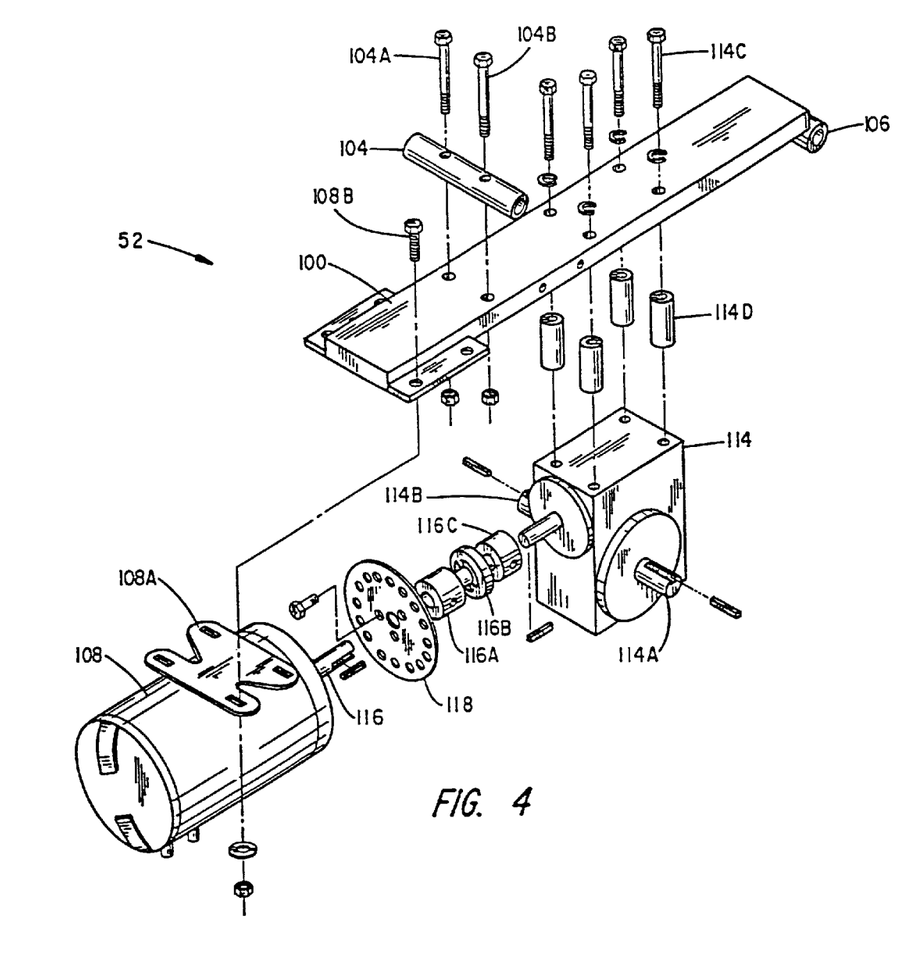
FIG. 4 is an exploded perspective view of the drive assembly of the present invention.

The chassis 12 includes two rectangular areas 84 and 86 in the aft portion for housing two parallel banks of batteries. Rectangular area 84 hold three batteries 88, 90 and 92. Rectangular area 86 holds three batteries 94, 96 and 98. The batteries are preferably 6 V, 150 Hz, lead acid cells. The drive assembly 52, shown in exploded view in FIG. 4, is located between the two rectangular areas. The drive assembly 52 includes a mount plate 100 which is hinged to the chassis 12 at 102 by rod assembly 104 which is secured to the plate with fasteners 104a and 104b. A lock pin assembly 106 is located at the rear of the drive assembly 52 for locking the drive assembly 52 to the chassis 12. The drive assembly 52 includes a motor 108 which is preferably a 2 HP DC 36 V motor with 50 amps. The motor is mounted to plate 100 with a bracket 108a and fasteners, one of which is designated 108b. The drive motor 108 utilizes dynamic braking. An electric load (resistance) is connected to the armature which will bring the motor to rest quickly.

Drive shaft 116 extends from motor 106 and is keyed to a tachometer disc 118 on a first side. The tachometer is coupled on its second side to drive shaft couplings 116a, 116b and 116c. These are in turn coupled to the gear reducer shaft 114a. The gear reducer 114 contains a worm gear drive (not shown) and reduces the rotation of the drive shaft 20 to 1. The rear wheels, one of which is shown as 110 in FIG. 3, mount on spindles 114b and 114c extending from the worm gear drive in the gear reducer 114.

Figure 5:
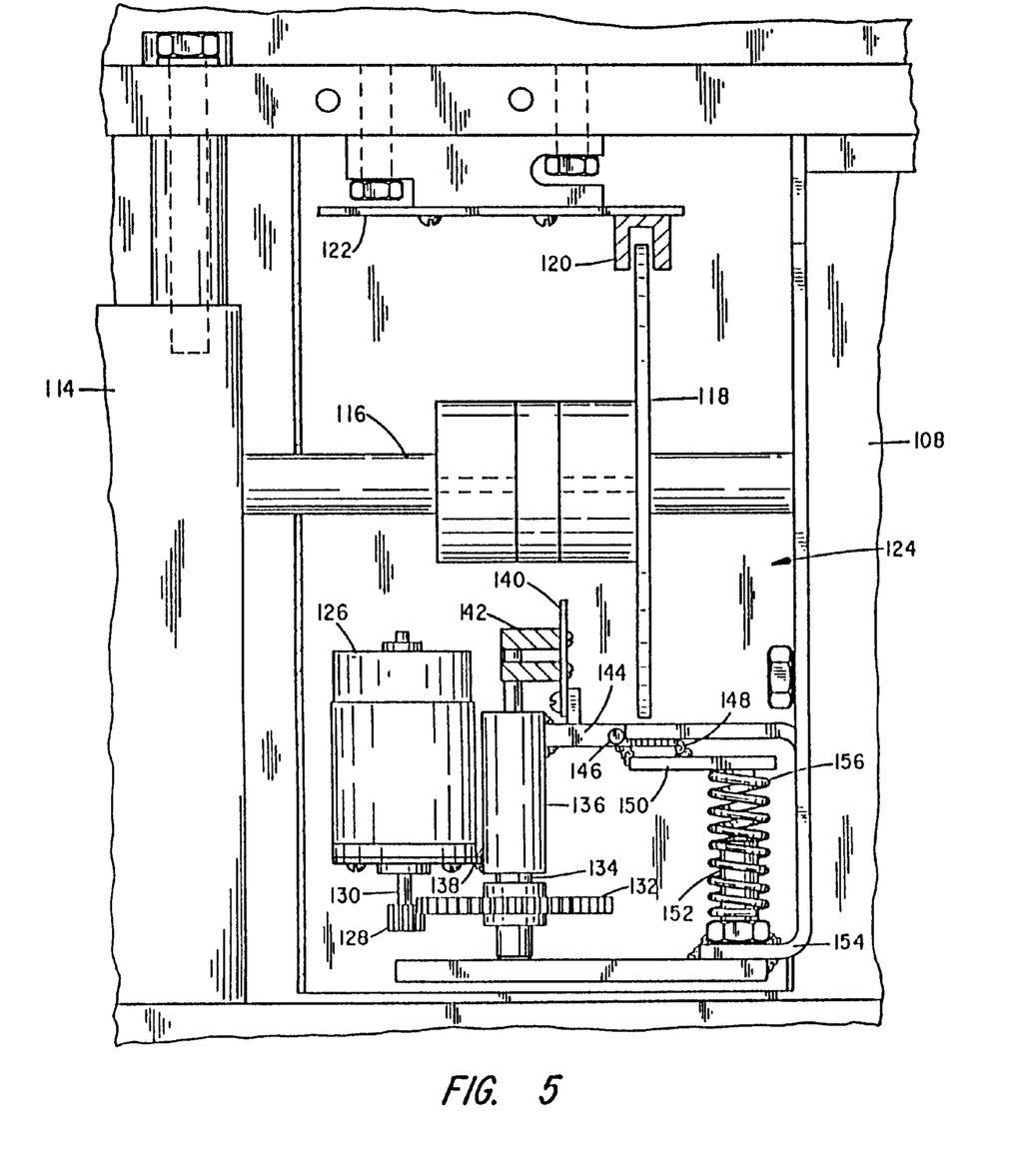
FIG. 5 is a side view of the drive and brake assembly of the present invention.

Turning now to FIG. 5, one end of tachometer disk 118 extends into an LED 120. LED 120 is coupled to the brake tachometer control board 122. The disc 118 has a plurality of slits equally spaced along its peripheral edge. As the disc 118 rotates, the LED switch 120 counts the plurality of slits and sends a signal representing the rotational rate of the motor shaft to the brake tachometer control board 122.

The drive assembly 52 additionally includes an emergency or parking brake assembly 124, shown in FIG. 5, which acts as a safety or emergency brake for the vehicle 10 when it is at rest on a hill. The emergency brake includes a 12 V DC PM motor 126. A pinion gear 128 is located on the drive shaft 130 of the motor 126 and engages a spur gear 132 which is mounted on a lead screw 134. The lead screw 134 is threaded into a rocker arm 136. The rocker arm 136 is bolted to the motor 126 at area 138. At the opposing end, a parking brake position PC board 140 and LED switch 142 is fastened to the lead screw 134 and a pivot arm 144 extends from the rocker arm 136. This pivot arm 144 is secured to a pivot pin 146. The portion 148 of the pivot arm 144 that extends on the side of the pivot pin opposite from the rocker arm 136 is welded to a spring plate 150.

A compression spring 152 is mounted to the brake mounting bracket 154. The free end 156 of the compression spring 152 rests against the spring plate 150. The spring 152 acts to push the pivot arm portion 148 against the tachometer disc 118. The friction between the pivot arm 144 and the tachometer disc 118 prevents rotation of the disc 118, drive shaft 116, gear reducer shift 114a and the rear wheels. When the brake is released, the motor 126 acts to rotate the lead screw 134 causing the pivot arm portion 148 to pivot away from contacting the tachometer disc 118. The motor 126 thus works against the action of the spring 152. When the brake actuator PC Board 122 receives a signal to engage the brake, the motor 126 reverses, the spring 152 pushes against the pivot arm 144, causes portion 148 to contact the tachometer disc. When the brake is to be released, the motor 126 is powered and rotates the lead screw 134 to cause the pivot arm 144 to move away from the tachometer disc 118. The LED 142 detects the position of the pivot arm 144 with respect to the tachometer disc 118. The brake position PC board 140 then sends the appropriate signal to the brake actuator PC board 122.

The vehicle additionally has a feature which prevents the motor from rotating at an predetermined unsafe speed for the vehicle. As the tachometer disc 118 rotates with the motor shaft 116, the LED switch 120 counts the slits in the disc 118 and the rotational speed of the disc is determined. A feedback loop is utilized to limit the maximum motor output rpm. This motor output speed can be adjusted to maintain the vehicle at low speeds and should not exceed 5–7 mph.

Figure 8:
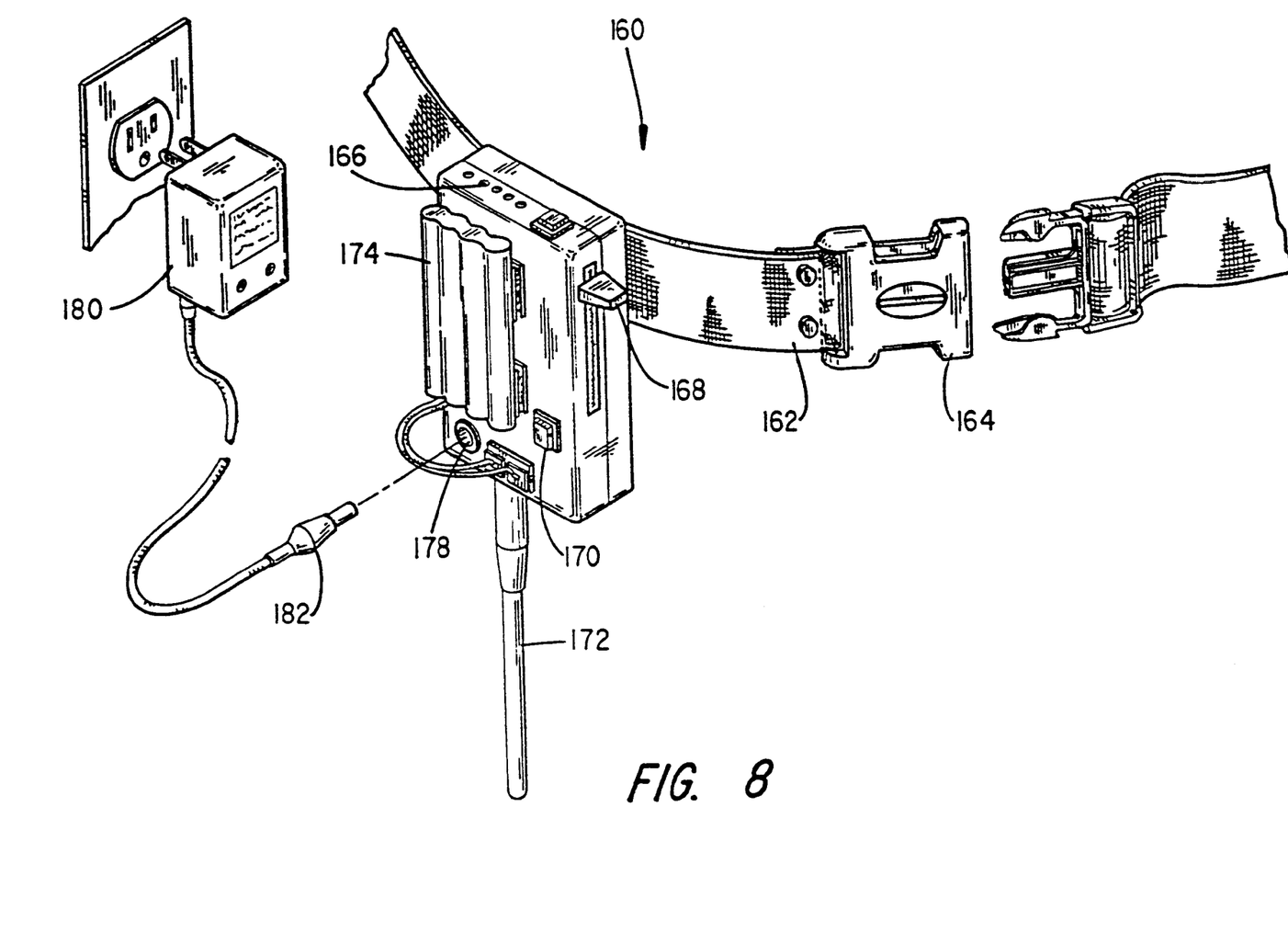
FIG. 8 is a perspective view of the remote control transmitter of the present invention.

Turning to FIG. 8, the remote control transmitter 160 is shown. The remote control transmitter 160 is hooked to a nylon belt 162 with a quick release buckle 164. The remote control transmitter 166 includes a charge level indicator 166 consisting of five LEDs. An accelerator thumb operated lever 168 controls the forward speed and braking of the vehicle. A transmit enable push-button 170 must be held down continuously to operate the machine. A whip antenna 172 extends from the lower portion of the transmitter 160. A battery pack 174 consisting of eight 1.2 volt encased NiCad cells is secured to the transmitter 160 with pads 176 made out of hook and loop material, such as Velcro®. The transmitter 160 includes a charging socket 178 for the batteries. A transformer-rectifier 180 and corresponding charger jack 182 is used for charging the transmitter 160. The transmitter preferably operates on an FM frequency.

Figure 10:
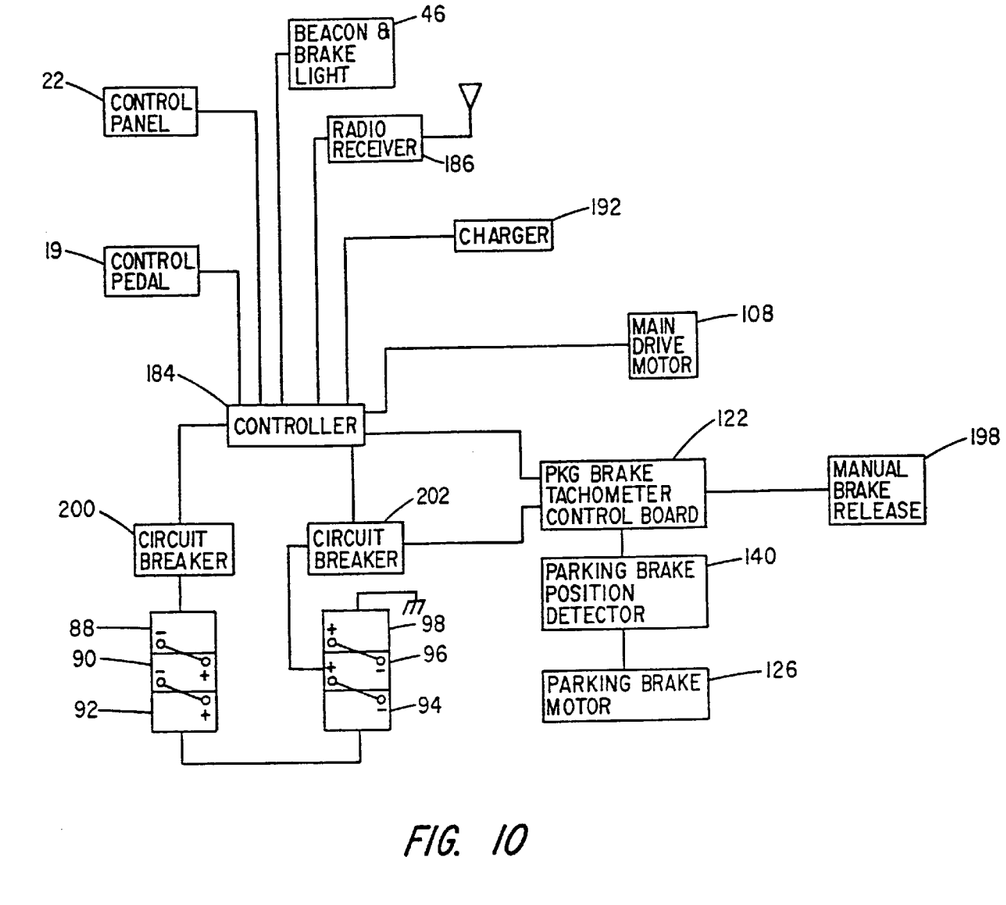
FIG. 10 is a schematic view of the controls of the present invention.

The vehicle 10 includes a central controller 184 as seen in FIG. 10. The console control 22 located on the steering column 24 and the control pedal 19 are coupled to the controller 184. Likewise, the radio receiver 186 on the antenna 16 and the beacon 46 and brake light 48 located on the antenna pole 16 are coupled to the controller 184. The controller 184 will process the signal sent from the control console 22 or from the remote transmitter 160 via the radio receiver 186. The controller 184 then sends the appropriate signal to the main drive motor 106, or the brake tachometer PC board 122. The parking brake tachometer control board 122 connected to the parking brake position detector 140, parking brake motor 196 and parking brake manual release 198. The parking brake manual release is an internal latch and not shown. The parking brake tachometer control board 122 is additionally connected to one of the two circuit breakers 200 and 202. The six batteries 204, 206, 208, 210, 212 and 214 are connected to the controller 184 with the circuit breakers 200 and 202 interposed. The circuit breakers 200 and 202 are accessed in the foot recess 18 as seen in FIG. 2.

OPERATION OF THE VEHICLE

The vehicle 10 is operated in either a manual mode with the operator seated on the vehicle or in the remote control mode using the portable transmitter 160. In the manual mode, the operator controls functions from the control console 22 on the steering column 24 and drives the vehicle using the steering wheel 20 and the speed/brake pedal 19. To start the vehicle, the circuit breakers 200 and 202 underneath the seat are switched on and the key is inserted in the key switch 32. The key is tuned clockwise to apply the operating power. When the manual mode is selected with switch 38, the indicator light 38a is on. The vehicle is steered in the same manner as an automobile. From the control console 22, the motion direction is selected by pressing the forward/reverse push-button 36. The selected direction will be shown by the lighting of the indicator 36a "forward" or indicator 36b "reverse".

The speed of the vehicle is controlled by foot pressure on the pedal 19. When the pedal 19 is released, dynamic braking action slows the unit to a stop, and the emergency or parking brake is automatically set to prevent rolling. Release of the pedal 19 also lights the brake light 48 on the vehicle.

To operate the vehicle in the remote mode, the remote control transmitter 160 is secured to the operator's waist. The circuit breakers 200 and 202 are positioned to "on" and the key is inserted in the key switch 32 at the control console 22. The key is turned clockwise to apply the operating power. The manual/remote push-button 38 is pressed to set the remote mode which causes the remote indicator 38b to light. The operator then activates the transmit enable push button 170 on the transmitter. The lever 168 is then moved slowly causing the vehicle 10 to move forward. As a safety feature, the transmit enable push button 170 must be depressed in order to send the signal. As soon as it is released, the signal stops and the vehicle 10 stops.

Figure 6:
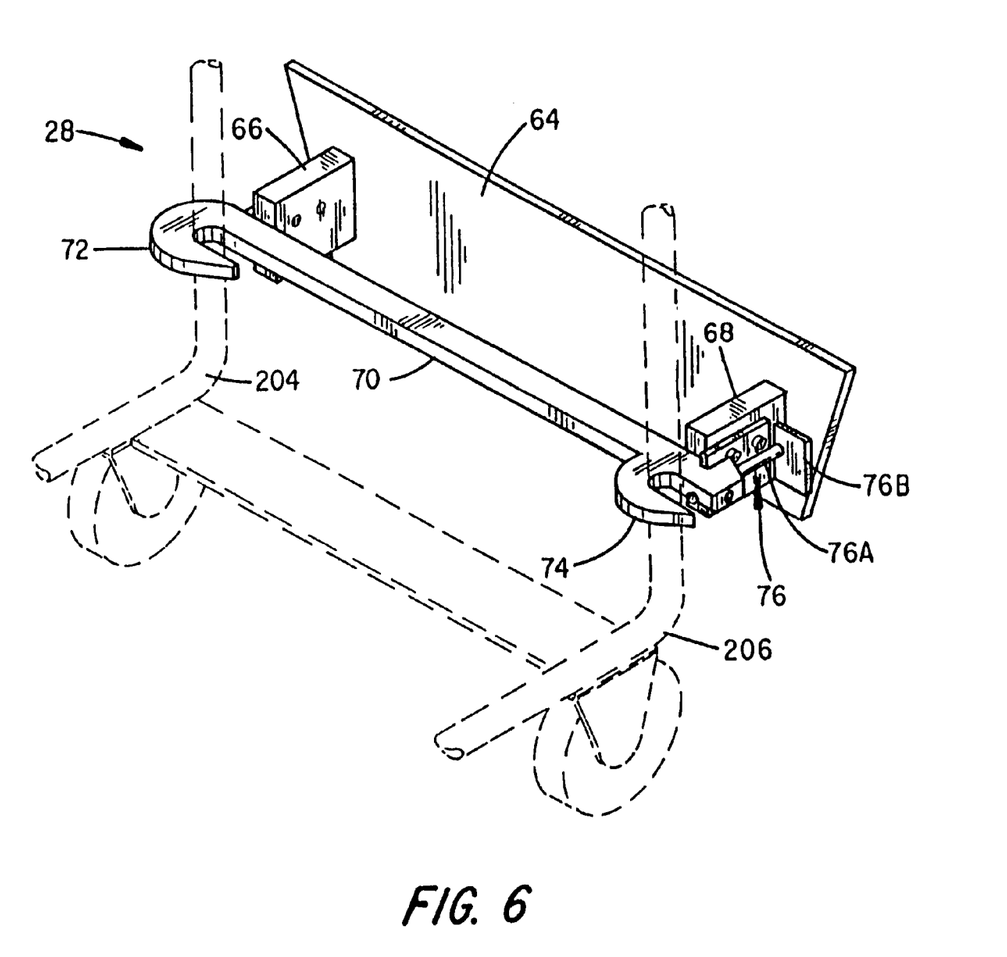
FIG. 6 is a perspective view of the cart coupler assembly of the present invention.

The shopping cart coupler assembly 28 is used in both the manual and remote control modes. To engage the cart coupler assembly to the shopping cart, the rear of the first shopping cart is positioned so that its vertical rear frame members 204 and 206 are against the coupler assembly as seen in FIG. 6. The shopping cart is slid sideways about 2 inches to cause its rear frame members to engage both coupler jaws 72 and 74. The locking pin 76 is pushed across the open portion 78 of jaw 72 to secure the shopping cart to the coupler assembly 28. As additional carts are collected, they are stacked to the cart secured to the cart coupler assembly 28. The operator guides the vehicle 10 with the waistband transmitter 160 by operating the speed lever switch 168 and steering the head cart in the line. Stray carts are added to the front of the line as the collecting work proceeds through the parking lot. The vehicle will push up to 75 carts in rain, snow, sleet and ice. While the operator distributes the carts inside the store, he or she advances the cart line through the door via the radio.

The vehicle 100 is preferably stored indoors in an area where it can be charged and service. The antenna pole 26 can be folded down when stored. Charging of the vehicle requires connecting the charging cable (not shown) to the charge outlet 208 on the vehicle and a source of 115 V AC. To avoid accumulation of explosive hydrogen gas from charging batteries, the vehicle should be in a well-ventilated area and the housing should be raised. A support rod is located in the chassis 12 and is used to keep the hinged housing 14 raised as seen in FIG. 9. When the brake or drive assemblies need servicing, jack screws 60 and 62 are first extended to support the vehicle 10 and the upper housing 14 is then raised. The lock pin 106 is removed and the drive assembly is pivoted upward about bar 104 for servicing. Raising the upper housing 14 also gives access to the controller 184, the batteries 88, 90, 92, 94, 96 and 98 and the other components of the vehicle.

The vehicle also has an optional accessory to provide traction ballast. This consists of a bracket 226 secured to the rear of the device into which weights may be placed. Up to 250 pounds of additional weight may be added at the rear of the vehicle. A front bracket (not shown) may be used for adding weight at the front of the vehicle. Another optional feature is a hitch 230 located in the rear of the vehicle for towing small trailers. A waste container can be readily secured to the upper housing for receiving in trash found in the parking lot.

While this invention has been described in conjunction with the preferred embodiment thereof, various modifications and changes therein may be made by those skilled in the art to which it pertains without departing from the spirit and scope of this invention.

What is claimed is:

1. A vehicle for moving at least one wheeled cart, the vehicle comprising:
    a chassis supported by at least two wheels;
    electric drive means supported by the chassis, the drive means coupled to the at least two wheels;
    means for generating a drive signal, the drive signal comprising at least one target speed;
    a controller coupled to the electric drive means, the controller operative to energize the electric drive means to move the vehicle in response to the drive signal;
    a front plate mounted on the chassis;
    two jaws protruding from the front plate, wherein said jaws operate to engage corresponding vertical frame members of the at least one wheeled cart; and
    locking means for locking the at least one wheeled cart to at least one of the jaws, wherein the locking means includes a moveable pin positionable across an open portion of one of the two jaws.

2. The vehicle of claim 1, wherein the means for generating a drive signal comprises a remote transmitter; and
    the vehicle further comprises a receiver on the vehicle for communicating with the remote transmitter, the receiver connected to the controller.

3. The vehicle of claim 2 wherein the remote control comprises a speed control actuator.

4. The vehicle of claim 3 wherein the speed control actuator comprises a speed control lever operable to select from a range of vehicle speeds.

5. The vehicle of claim 1 further comprising:
    means for controlling the vehicle speed at the target speed including:
    a disk coupled to the electric drive means;
    the disk including a plurality of apertures along a circumference of a concentric area of the disk; and
    means for counting the plurality of apertures as the disk rotates.

6. The vehicle of claim 5 further comprising a speed limiter for preventing the vehicle from exceeding a predetermined speed.

7. The vehicle of claim 1 further comprising:
    means for braking the vehicle including:
    a motor drive shaft coupled to at least one of the two wheels;
    a brake disk on the motor drive shaft;
    a moveable rocker arm adjacent the brake disk; and
    means for positioning the rocker arm in a first position in friction contact with the brake disk and a second position wherein the friction contact is released.

8. The vehicle of claim 1 wherein the means for generating a drive signal comprises a speed control actuator for selecting from a range of vehicle speeds.

9. The vehicle of claim 8 wherein the speed control actuator comprises a foot pedal having an extent of pedal travel that corresponds to the range of vehicle speeds.

10. The vehicle of claim 8 wherein the speed control actuator comprises a foot pedal wherein a first portion of pedal travel activates a dynamic braking mechanism and a second portion of pedal travel corresponds to the range of vehicle speeds.

11. The vehicle of claim 1 further comprising an operator seat.

12. The vehicle of claim 1 further comprising a steering wheel mounted on a steering column coupled to a steering mechanism, the steering mechanism operable to steer the at least two wheels by turning the steering wheel.

13. The vehicle of claim 1 wherein the speed control actuator comprises a foot pedal, the vehicle further comprising:
    a steering wheel mounted on a steering column coupled to a steering mechanism, the steering mechanism operable to steer the at least two wheels by turning the steering wheel; and
    a housing hinged to the chassis, the housing including an opening through which the steering column extends from the steering mechanism.

14. A vehicle for moving at least one wheeled cart, the vehicle comprising:
- a chassis supported by at least two wheels;
- electric drive means supported by the chassis, the drive means coupled to the at least two wheels;
- means for generating a drive signal, the drive signal comprising at least one target speed;
- a controller coupled to the electric drive means, the controller operative to energize the electric drive means to move the vehicle in response to the drive signal, the controller comprising means for controlling the vehicle speed at the target speed including:
  - a disk coupled to the electric drive means;
  - the disk including a plurality of apertures along a circumference of a concentric area of the disk;
  - means for counting the plurality of apertures as the disk rotates; and
  - means for coupling the at least one wheeled cart to the vehicle;
- a front plate mounted on the chassis;
- two arcuate jaws protruding from the front plate, the arcuate jaws operative to engage corresponding vertical rear frame members of the at least one wheeled cart; and
- locking means for locking the at least one wheeled cart, wherein the locking means includes a moveable pin positionable across an open portion of one of the two arcuate jaws.

15. The vehicle of claim, 14 further comprising a speed limiter for preventing the vehicle from exceeding a predetermined speed.

16. The vehicle of claim 14 further comprising:
means for braking the vehicle including:
- a motor drive shaft coupled to at least one of the two wheels;
- a brake disk on the motor drive shaft;
- a moveable rocker arm adjacent the brake disk; and
- means for positioning the rocker arm in a first position in friction contact with the brake disk and a second position wherein the friction contact is released.

17. The vehicle of claim 14 wherein the means for generating a drive signal comprises a speed control actuator for selecting from a range of vehicle speeds.

18. The vehicle of claim 17 wherein the speed control actuator comprises a foot pedal having an extent of pedal travel that corresponds to the range of vehicle speeds.

19. The vehicle of claim 17 wherein the speed control actuator comprises a foot pedal wherein a first portion of pedal travel activates a dynamic braking mechanism and a second portion of pedal travel corresponds to the range of vehicle speeds.

20. The vehicle of claim 14 wherein the means for generating a drive signal comprises a remote transmitter; and wherein the vehicle further comprises a receiver on the vehicle for communicating with the remote transmitter, the receiver connected to the controller.

21. The vehicle of claim 20 wherein the remote transmitter comprises a speed control actuator.

22. The vehicle of claim 21 wherein the speed control actuator comprises a speed control level operable to select from a range of vehicle speeds.

23. The vehicle of claim 14 further comprising an operator seat.

24. The vehicle of claim 14 further comprising a steering wheel mounted on a steering column coupled to a steering mechanism, the steering mechanism operable to steer the at least two wheels by turning the steering wheel.

25. The vehicle of claim 19 wherein the speed control actuator comprises a foot pedal, the vehicle further comprising:
- a steering wheel mounted on a steering column coupled to a steering mechanism, the steering mechanism operable to steer the at least two wheels by turning the steering wheel; and
- a housing hinged to the chassis, the housing including an opening through which the steering column extends from the steering mechanism.

26. A vehicle for moving at least one wheeled cart, the vehicle comprising:
- a chassis supported by at least two wheels;
- electric drive means supported by the chassis, the drive means coupled to the at least two wheels;
- means for generating a drive signal, the drive signal comprising at least one target speed;
- a controller coupled to the electric drive means, the controller operative to energize the electric drive means to move the vehicle in response to the drive signal, the controller comprising means for controlling the vehicle speed at the target speed and means for braking the vehicle, the means for braking including:
  - a motor drive shaft coupled to at least one of the two wheels;
  - a brake disk on the motor drive shaft;
  - a moveable rocker arm adjacent to the brake disk;
  - means for positioning the rocker arm in a first position in friction contact with the brake disk and a second position wherein the friction contact is released; and
  - means for coupling at least one wheeled cart to the vehicle, the means for coupling including:
- a front plate mounted on the chassis;
- two arcuate jaws protruding from the front plate, the arcuate jaws operative to engage corresponding vertical rear frame members of the at least one wheeled cart; and
- locking means for locking the at least one wheeled cart, wherein said locking means includes a moveable pin positionable across an open portion of one of the two arcuate jaws.

27. The vehicle of claim 26 wherein the means for controlling the vehicle speed at the target speed further comprises:
- a disk coupled to the electric drive means;
- the disk including a plurality of apertures along a circumference of a concentric area of the disk; and
- means for counting the plurality of apertures as the disk rotates.

28. The vehicle of claim 26 further comprising a speed limiter for preventing the vehicle from exceeding a predetermined speed.

29. The vehicle of claim 26 wherein the means for generating a drive signal comprises a speed control actuator for selecting from a range of vehicle speeds.

30. The vehicle of claim 29 wherein the speed control actuator comprises a foot pedal having an extent of pedal travel that corresponds to the range of vehicle speeds.

31. The vehicle of claim 29 herein the speed control actuator comprises a foot pedal wherein a first portion of pedal travel activates a dynamic braking mechanism and a second portion of pedal travel corresponds to the range of vehicle speeds.

32. The vehicle of claim 26 wherein the means for generating a drive signal comprises a remote transmitter; and wherein the vehicle further comprises a receiver on the vehicle for communicating with the remote transmitter, the receiver connected to the controller.

33. The vehicle of claim 32 wherein the remote transmitter comprises a speed control actuator.

34. The vehicle of claim 33 wherein the speed control actuator comprises a speed control lever operable to select from a range of vehicle speeds.

35. The vehicle of claim 26 further comprising an operator seat.

36. The vehicle of claim 26 further comprising a steering wheel mounted on a steering column coupled to a steering mechanism, the steering mechanism operable to steer the at least two wheels by turning the steering wheel.

37. The vehicle of claim 29 wherein the speed control actuator comprises a foot pedal, the vehicle comprising:
- a steering wheel mounted on a steering column coupled to a steering mechanism, the steering mechanism operable to steer the at least two wheels by turning the steering wheel; and
- a housing hinged to the chassis, the housing including an opening through which the steering column extends from the steering mechanism.

* * * * *

UNITED STATES PATENT AND TRADEMARK OFFICE
CERTIFICATE OF CORRECTION

PATENT NO. : 5,934,694
DATED : August 10, 1999
INVENTOR(S) : William Schugt et al.

It is certified that error appears in the above-identified patent and that said Letters Patent is hereby corrected as shown below:

Claim 25,
Line 1, please change "19" to -- 17 --.

Claim 31,
Line 1, please change "herein" to -- wherein --.

Signed and Sealed this

Twenty-eighth Day of August, 2001

*Attest:*

*Nicholas P. Godici*

NICHOLAS P. GODICI
*Attesting Officer*    *Acting Director of the United States Patent and Trademark Office*